(12) United States Patent
Naito

(10) Patent No.: US 6,885,546 B2
(45) Date of Patent: Apr. 26, 2005

(54) METAL FOIL CONSISTING OF ALLOY OF EARTH-ACID METAL, AND CAPACITOR PROVIDED WITH THE SAME

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 18 days.

(21) Appl. No.: 10/758,042

(22) Filed: Jan. 16, 2004

(65) Prior Publication Data

US 2004/0207973 A1 Oct. 21, 2004

Related U.S. Application Data

(63) Continuation-in-part of application No. 10/197,262, filed on Jul. 18, 2002, now Pat. No. 6,795,299, and a continuation-in-part of application No. PCT/JP02/07304, filed on Jul. 18, 2002.
(60) Provisional application No. 60/306,898, filed on Jul. 23, 2001.

(30) Foreign Application Priority Data

Jul. 18, 2001 (JP) ........................... 2001-218223

(51) Int. Cl.⁷ .............................................. H01G 9/042
(52) U.S. Cl. ...................... 361/509; 361/528; 252/62.2; 29/25.03
(58) Field of Search ................................ 361/508–509, 361/516, 528, 530, 532; 29/25.03; 204/290.01, 290.12, 290 R; 252/62.2

(56) References Cited

U.S. PATENT DOCUMENTS 5,754,394 A * 5/1998 Evans et al. ................ 361/516
6,051,044 A * 4/2000 Fife ............................. 75/229
6,200,440 B1 * 3/2001 Moran et al. .......... 204/290.01
6,351,370 B1 * 2/2002 Konuma et al. ............. 361/523
6,359,769 B1 * 3/2002 Mushiake et al. ........... 361/502
6,381,121 B1 * 4/2002 Monden et al. .............. 361/525

FOREIGN PATENT DOCUMENTS

| EP | 1 158 552 A1 | 11/2001 |
| JP | 3-6808 | 1/1991 |
| JP | 4-44205 | 2/1992 |
| JP | 11-87182 | 3/1999 |
| JP | 2000-68157 | 3/2000 |
| JP | 2001-155969 | 6/2001 |
| JP | 2001-167980 | 6/2001 |

OTHER PUBLICATIONS

International Search Report for PCT/JP02/07304 dated Sep. 3, 2002.

English translation of International Preliminary Examination Report for PCT/JP02/07304 dated Jun. 24, 2003.

* cited by examiner

Primary Examiner—Anthony Dinkins
(74) Attorney, Agent, or Firm—Sughrue Mion, PLLC

(57) ABSTRACT

A metal foil having a surface roughened by etching, which is made of an alloy having an earth-acid metal, preferably niobium, as a main component. A capacitor having a pair of electrodes and a dielectric material interposed between said pair of electrodes, wherein at least one of the electrodes is made of the above-mentioned metal foil, exhibits good high-frequency characteristics, and can be a small-size capacitor having a large capacitance.

32 Claims, No Drawings

METAL FOIL CONSISTING OF ALLOY OF EARTH-ACID METAL, AND CAPACITOR PROVIDED WITH THE SAME

CROSS REFERENCE TO RELATED APPLICATIONS

This application is a continuation-in-part application of (i) U.S. application Ser. No. 10/197,262 filed Jul. 18, 2002 now U.S. Pat No. 6,795,299 which claims benefit of U.S. Provisional Application No. 60/306,898 filed Jul. 23, 2001, and is a continuation-in-part application of (ii) PCT/JP02/07304 filed Jul. 18, 2002; the above-noted applications incorporated herein by reference in their entirety.

TECHNICAL FIELD

This invention relates to an etched metal foil, and a capacitor provided with the etched metal foil as one part electrode. More particularly, it relates to a metal foil made of an alloy comprising an earth-acid metal as a main component, which foil has been etched to roughen the surface thereof, and to a capacitor provided with the etched metal foil as one part electrode.

BACKGROUND ART

Capacitors for use in electronic instruments are demanded to have a small size and a large capacitance. As one example of such capacitors, a capacitor having an etched aluminum foil for one part electrode is known. In this capacitor, the electrode is etched from the surface toward the inside to a predetermined thickness whereby the actual surface area is enlarged. As the surface area is larger, the capacitance can be larger. Therefore, etching conditions, etching method, etching agent and other related factors have been studied with an attempt to enlarge the surface area of electrode. With respect to the etching method, a chemical etching method and an electrical etching method were usually combined to reduce the etching pore size or increase the etching depth to thereby enlarge the surface area. However, there was a limit in enlarging the surface area while keeping various strengths of the electrode. Studies have also been made to more increase the thickness of electrode than usual to thereby attain the enlargement of surface area and the maintenance of high strengths, however, this contradicts the downsizing of capacitors and therefore could not be a substantial improvement.

On the other hand, as a capacitor having a small size and a large capacitance, a capacitor provided with a sintered body of tantalum for one part electrode is known. This capacitor is made by molding a tantalum powder and then sintering the thus-obtained molding, and, in the capacitor, the surface area of pores among powders inside the sintered body contributes to the capacitance of capacitor. However, in the case of a relatively large sintered body, it is difficult to impregnate another part electrode (usually, a solid compound) into the vicinity of the center of sintered body. AS a result, the appearance capacitance is disadvantageously small for the surface area. Furthermore, the distance from the outer surface to the center of the sintered body is long, and therefore, if the another part electrode is the same, a capacitor using the sintered body for the electrode is inferior in the high frequency performance as compared with the capacitor using the above-described etched aluminum foil for the electrode.

Despite these problems, in a capacitor using the tantalum sintered body for one part electrode, an oxide of tantalum can be used as a dielectric material, and the dielectric constant of the tantalum oxide is about three times as large as the dielectric constant of the aluminum oxide. Therefore, tantalum is an attractive material for enlarging the capacitance, and many studies have been made thereon so as to solve the above-described problems.

One example of such studies is an attempt to manufacture an etched foil of tantalum as an electrode material. However, desired etching of the foil of an earth-acid metal itself including tantalum is difficult or even impossible. For example, tantalum is soluble in hydrofluoric acid and therefore, a method of electrolytically oxidizing tantalum in hydrofluoric acid to manufacture an etched foil was employed. However, in practice, only edge parts of tantalum foil dissolved and etching of the entire foil surface was impossible. Studies were once made to incorporate additives to a tantalum starting material to thereby improve the etching property, however, this could not be a remarkable technical improvement. For example, a proposal has been made in Japanese Unexamined Patent Publication No. S46-7251 (the term "Japanese Unexamined Patent Publication" as used herein is hereinafter abbreviated to "JP-A"), wherein a tantalum foil was obtained from a mixture of tantalum with a vanadium compound, or a mixture of tantalum with a tantalum-vanadium alloy, but, the etching property was not improved.

Niobium belongs to the same group as tantalum. Niobium oxide has higher dielectric constant than tantalum oxide, and therefore, it is considered that by manufacturing an etched foil of niobium, a capacitor having a higher capacitance can be produced. However, this has not been practiced up to the present.

DISCLOSURE OF THE INVENTION

In view of the foregoing, an object of the present invention is to provide a metal foil suitable for an electrode of a capacitor, especially a metal foil exhibiting good high-frequency performance, which enables to give a capacitor having a small size but a large capacitance; and to provide a capacitor having the metal foil as one part electrode.

As a result of extensive investigations to solve the above-described problems, the present inventor has found that even if desired etching on the foil of an earth-acid metal itself is impossible or difficult, an alloy foil comprising an earth-acid metal as a main component can be etched under specific conditions. The present invention has been accomplished based on this finding. By the term "the main component" as used herein we mean that the specified component is contained in the largest amount and in an amount of at least 50% by mass.

The reasons why the etching of a foil of an alloy comprising an earth-acid metal as a main component can be made are not clearly known, but it is presumed that the bonding between atoms of an earth-acid metal itself becomes weak when alloyed, as a result, resistance against electrochemical or chemical corrosion is deteriorated.

Thus, in a first aspect of the present invention, there is provided a metal foil having a surface roughened by etching, characterized in that the metal foil is made of an alloy comprising an earth-acid metal as a main component, and has a surface area at least 50 times the surface area before etching.

In a second aspect of the present invention, there is provided a metal foil having a surface roughened by etching, characterized in that the metal foil is made of an alloy comprising an earth-acid metal as a main component, and has pores at least in a region spanning from the surface to a depth of 5% or more of the foil thickness in the foil thickness direction, wherein the pores have an average pore diameter not larger than 10 μm.

In a third aspect of the present invention, there is provided a metal foil having a surface roughened by etching, which is made of an alloy comprising an earth-acid metal as a main component, and which gives an electrostatic capacitance of at least 200 μF/cm² per area (projected area) not including pore areas of the metal foil, to a capacitor comprised of one part electrode made of the metal foil, a dielectric material formed on the surface of said metal foil by electrolytic oxidation at an imposed voltage of 10 V, and another part electrode provided on said dielectric material.

In a fourth aspect of the present invention, there is provided a capacitor comprising a pair of electrodes and a dielectric material interposed between said pair of electrodes, wherein at least one of the electrodes is made of the metal foil as mentioned in any one of the first, second and third aspects of the present invention.

The metal foil of the present invention and the capacitor of the present invention preferably satisfy at least one of the following characteristics.

(1) The earth-acid metal is niobium.
(2) The alloy comprising an earth-acid metal as a main component is an alloy of an earth-acid metal with at least one element selected from the group consisting of Groups 3 to 16 as expressed by the group number of the periodic table.
(3) The metal foil has been partially nitrided.
(4) At least a part of the surface of the metal foil including the surface of inside pores has been partially nitrided.
(5) The metal foil has pores at least in a region spanning from the surface to a depth of 5% or more of the foil thickness in the thickness in the foil thickness direction.
(6) The metal foil has a surface area at least 50 times the surface area before etching.
(7) In the metal foil as described in (6) above, the pores have an average pore diameter not larger than 100 μm.
(8) The concentration of impurity elements other than tantalum, niobium, oxygen, nitrogen and an alloy-forming metal element in the alloy is not larger than 300 ppm by mass.
(9) The metal foil gives an electrostatic capacitance of at least 200 μF/cm² per area not including pore areas of said metal foil (i.e., projected area of the metal foil), to a capacitor comprised of one part electrode made of the metal foil, a dielectric material formed on the surface of said metal foil by electrolytic oxidation at an imposed voltage of 10 V, and another part electrode provided on said dielectric material.
(10) In the capacitor of the present invention, the dielectric material comprises tantalum oxide or niobium oxide as a main component.
(11) In the capacitor of the present invention, the dielectric material comprises ditantalum pentoxide or diniobium pentoxide as a main component.
(12) In (10) and (11) above, the dielectric material has been formed by an electrolytic oxidation.
(13) In (10), (11) and (12) above, another part electrode is comprised of at least one material selected from electrolytic solutions, organic semiconductors and inorganic semiconductors.
(14) In (10), (11) and (12) above, the another part electrode is comprised of an organic semiconductor which is at least one organic semiconductor selected from the group consisting of an organic semiconductor comprising a benzopyrroline tetramer and chloranile, an organic semiconductor mainly comprising tetrathiotetracene, an organic semiconductor mainly comprising tatracyanoquinodimethane, and an organic semiconductor mainly comprising an electrically conductive polymer obtained by doping with a dopant a polymer having repeating units represented by the following formula (1) or (2):

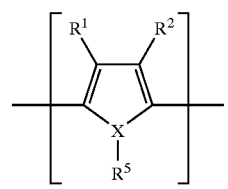

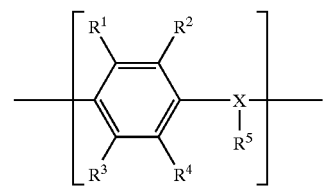

wherein $R^1$ to $R^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a trifluoromethyl group, a phenyl group and a substituted phenyl group: the hydrocarbon chains of $R^1$ and $R^2$, or the hydrocarbon chains of $R^3$ and $R^4$ may combine together with each other at an arbitrary position to form a divalent chain for forming at least one 3-, 4-, 5-, 6- or 7-membered cyclic saturated or unsaturated hydrocarbon structure together with the carbon atoms having bonded thereto $R^1$ and $R^2$ or $R^3$ and $R^4$; the cyclic combined chain may contain a bond of carbonyl, ether, ester, amide, sulfide, sulfinyl, sulfonyl or imino at an arbitrary position, X represents an oxygen atom, a sulfur atom or a nitrogen atom; and $R^5$ is present only when X is a nitrogen atom, and independently represents a hydrogen atom or a linear or branched, saturated or unsaturated allyl group having from 1 to 10 carbon atoms.

(15) In the capacitor of (14) above, the organic semiconductor is at least one member selected from polypyrrole, polythiophene, polyaniline and substitution derivatives thereof.
(16) The electrically conductive polymer represented by the formula (1) in (14) above is an electrically conductive polymer having repeating units represented by the following formula (3):

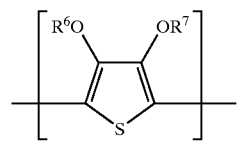

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

(17) The electrically conductive polymer as mentioned in (16) above is an electrically conductive polymer obtained by doping poly(3,4-ethylenedioxythiophene) with a dopant.

BEST MODE FOR CARRYING OUT THE INVENTION

The etched metal foil of the present invention is an etched metal foil obtained by etching a surface of an alloy foil comprising an earth-acid metal as a main component, whereby the surface is roughened, and the etched metal foil is suitably used as an electrode of a capacitor.

The earth-acid metal includes vanadium, tantalum and niobium. In the present invention tantalum and niobium are preferred, and niobium is especially preferred. The earth-acid metal can be easily alloyed with other element by arc melting, electron beam melting or other means.

As the element for forming an alloy together with an earth-acid metal, at least one element selected from Groups 3 to 16 as expressed by the group number of the periodic table according to the IUPAC Inorganic Chemistry Nomenclature is preferably used because the etched metal foil described later is particularly easy to manufacture. Among these elements, an alloy containing an element selected from Groups 3 to 7 and Groups 13 to 16 is preferred, and an alloy containing an element selected from Groups 3, 4, 6, 7 and 13 is especially preferred.

The content of these elements in the alloy varies depending on the kinds of elements or the objective etching depth (depth where pores are present in the foil thickness direction) or etching ratio (the ratio of the surface area of metal foil after etching to the surface area thereof before etching), described later, and therefore, the content of the elements is determined by previously performing a preliminary experiment, however, the content of the elements is usually from 400 to 100,000 ppm by mass. An alloy foil can be produced from the alloy by a conventional method such as cold rolling, hot rolling or a combination thereof. The thickness of the alloy foil is usually from 1 to 1,000 μm and the thickness of the etched alloy foil produced from the alloy foil is approximately the same.

In the present invention, partial nitriding of the alloy foil is effective because undesired surface oxidation occurring before etching, which is described later, can be minimized. The amount of nitrided alloy foil is usually in the range of 10 to 100,000 ppm by mass.

The nitridation of the alloy foil can be performed by any procedure of liquid nitridation, ton nitridation and gas nitridation or by a combination thereof. Among these, a gas nitridation treatment by a nitrogen gas atmosphere is preferred, because a simple apparatus can be used and the operation is easy. For example, the gas nitridation by a nitrogen gas atmosphere is achieved by allowing the alloy foil to stand in a nitrogen gas atmosphere. With a nitridation atmosphere temperature of not higher than 2,000° C. and a standing time within several hours, an alloy foil having an objective amount of nitridation can be obtained. By performing the treatment at a high temperature, the treatment time can be shortened. The amount of the nitrided alloy foil can be controlled by the conditions of nitridation temperature and nitridation time of the material to be nitrided, which are confirmed by a preliminary test or other means.

The etched metal foil of the present invention can be produced by chemically or/and electrochemically etching the above-mentioned alloy foil. Before conducting the etching, the alloy foil may be subjected to a surface treatment such as degreasing treatment or ultrasonic treatment. The chemical etching method is a method of etching the alloy foil using at least one compound selected from an acid such as nitric acid, hydrochloric acid, sulfuric acid and hydrofluoric acid, or an alkali, and hydrogen peroxide. The electrochemical etching method is a method of etching the alloy foil by applying direct-current or/and alternating current thereto in an electrolytic solution. The objective etched foil of an alloy foil comprising an earth-acid metal as a main component can be produced by appropriately adopting these two etching methods.

In the present invention, it is effective to nitride at least a part of the etched metal foil surface or the etched metal foil surface including the surface of walls of inside pores, because the capacitor produced as described later from the etched metal foil can have good performance. The amount of nitridation is usually from 10 to 100,000 ppm by mass, as mentioned above. The nitridation can be performed by using the above-described nitridation method.

In the etched metal foil of the present invention, the depth of the etched pores can be changed usually in the range from 1 to 40% of the foil thickness in the foil thickness direction by carefully selecting the etching conditions. The etched pore depth is preferably at least 5% or more of the metal foil thickness, because the capacitance per apparent surface area (capacitance per unit area as measured at 120 Hz when the etched metal foil is chemically formed in an aqueous 0.1% by mass phosphoric acid solution at 80° C. by applying a voltage of 10 V; hereinafter the same) increases. In this case, the etching ratio (the ratio of the surface area of metal foil after etching to the surface area of metal foil after etching) is at least 50 times. When the etched pore depth reaches about 40% of the foil thickness, the etching ratio also logarithmically increases and can be around 10 times.

The average pore diameter (D50) of the etched metal foil of the present invention is usually not larger than 10 μm and when the above-described alternating current etching method is adopted, the average pore diameter D50 is in the range of 0.05 to 3 μm. The pore distribution usually shows a normal distribution on a samilogarithmic graph where the frequency and the pore diameter are taken on the ordinate and the abscissa, respectively, using a logarithmic scale. When the direct current etching method and the alternating current etching method are adopted in combination, the pore distribution can be made not a normal distribution but, for example, a distribution having two peaks. Also, by selecting the etching conditions, the pore distribution can be made a distribution such that D10 is in the range from 0.002 to 0.8 μm and D90 is in the range from 0.08 to 20 μm.

The concentration of impurity elements, other than the earth-acid metal, oxygen, nitrogen and an alloy-forming metal element, contained in an alloy constituting the etched metal foil of the present invention, is not larger than 300 ppm by mass, preferably not larger than 100 ppm by mass. If the concentration of the impurity elements exceeds 300 ppm by mass, the capacitor produced from the etched metal foil may suffer from defective performance and this is not preferred.

The etched metal foil of present invention reacts with oxygen in the air at room temperature and usually has an oxygen content of 10 to 50,000 ppm by mass, though this oxygen content varies depending on the etching ratio.

By chemically forming the etched metal foil of the present invention using the electrolyte oxidation method, an oxide dielectric film can be formed on the surface thereof. When the main component of the etched metal foil is tantalum, the dielectric material formed comprises a tantalum oxide as a main component. In this case, ditantalum pentoxide is the main component of the tantalum oxide. When the main component of an alloy constituting the etched metal foil is niobium, the dielectric material comprises niobium oxide as a main component. In this case, ditantalum pentoxide is usually the main component of the niobium oxide, however, niobium dioxide can be made the main component according to the chemical forming conditions.

As described above, the electrostatic capacitance per apparent surface area (projected area) when the etched metal foil of the present invention is chemically formed at an imposed voltage of 10 V can be voluntarily changed, however, usually, an etched metal foil having an electrostatic capacitance per apparent surface area of at least 200 $\mu$F/cm$^2$, preferably 400 $\mu$F/cm$^2$ is suitably used, because the capacitor produced from the etched metal foil can have a large capacitance.

Using the etched metal foil of the present invention for at least one part electrode, a capacitor can be produced by interposing a dielectric material between this one part electrode and another part electrode. Examples of the dielectric material used for the capacitor include dielectric materials comprising, as a main component, ditantalum pentoxide, diniobium pentoxide or a mixture of diniobium pentoxide and niobium dioxide. For example, a dielectric material comprising diniobium pentoxide can be obtained by chemically forming the niobium etched foil as one part electrode in an electrolytic solution. For chemically forming the etched niobium foil in an electrolytic solution, an aqueous protonic acid solution is generally used, such as an aqueous 0.1% phosphoric acid solution, an aqueous sulfuric acid solution, an aqueous organic acid solution, an aqueous adipic acid solution or an aqueous oxalic acid solution. In the case a dielectric material comprising diniobium pentoxide is obtained by chemically forming the niobium electrode in an electrolytic solution, the capacitor of the present invention is an electrolytic capacitor.

Another part electrode of the capacitor of the present invention is not particularly limited and, for example, at least one compound selected from electrolytic solutions, organic semiconductors and inorganic semiconductors, which are known in the art of aluminum electrolytic capacitors, can be used. Specific examples of the electrolytic solution include a dimethylformamide-ethylene glycol mixed solution having dissolved therein 5% by mass of isobutyltripropylammonium borotetrafluoride electrolyte, and a propylene carbonate-ethylene glycol mixed solution having dissolved therein 7% by mass of tetraethylammonium borotetrafluoride. Other specific examples of the electrolytic solution which can be used include electrolytic solutions conventionally used in the art of aluminum electrolytic capacitors. In the case where an electrolytic solution is used for the another part electrode, the etched metal foil of the present invention or an etched aluminum foil, etched titanium foil or etched titanium-coated aluminum foil for use in aluminum electrolytic capacitors can be used as the substantial outgoing electrode.

The substantial outgoing electrode may have on the surface thereof an oxide dielectric film chemically formed at an arbitrary voltage. The chemically forming solution used for the formation of oxide dielectric film may be, for example, the above-described chemically forming solution or a chemically forming solution mainly comprising an ammonium salt of a compound forming the above-described chemically forming solution.

Specific examples of the organic semiconductor used for the another part electrode include an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conductive polymer obtained by doping with a dopant a polymer containing a repeating unit represented by the following formula (1) or (2):

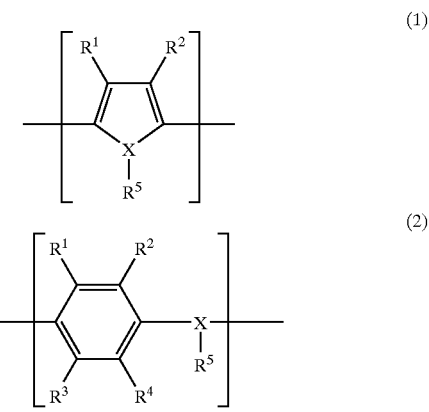

wherein R$^1$ to R$^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a trifluoromethyl group, a phonyl group and a substituted phenyl group; the hydrocarbon chains of R$^1$ and R$^2$, or R$^3$ and R$^4$ may combine with each other at an arbitrary position to form a divalent chain forming at least one 3-, 4-, 5-, 6- or 7-membered saturated or unsaturated cyclic hydrocarbon structure together with the carbon atoms having bonded thereto R$^1$ and R$^2$ or R$^3$ and R$^4$; the divalent chain forming cyclic hydrocarbon structure may contain a bond of carbonyl, ether, ester, amide, sulfide, sulfinyl, sulfonyl or imino at an arbitrary position; X represents an oxygen atom, a sulfur atom or a nitrogen atom; and R$^5$ is present only when X is a nitrogen atom, and independently represents a hydrogen atom or a linear or branched, saturated or unsaturated alkyl group having from 1 to 10 carbon atoms.

In the general formulae (1) and (2), R$^1$ to R$^4$ each independently represents preferably a hydrogen atom or a linear or branched, saturated or unsaturated alkyl or alkoxy group having from 1 to 6 carbon atoms, and each of the pairs R$^1$ and R$^2$, and R$^3$ and R$^4$ may combine together to form a ring. Examples of the polymer containing repeating units represented by formula (1) or (2) include polyaniline, polyoxyphenylene, polyphenylene sulfide, polythiophene, polyfuran, polypyrrole, polymethylpyrrole and derivatives of these polymers.

In the present invention, the electrically conductive polymer containing repeating units represented by formula (1) is preferably an electrically conductive polymer containing a structure unit represented by the following formula (3) as a repeating unit:

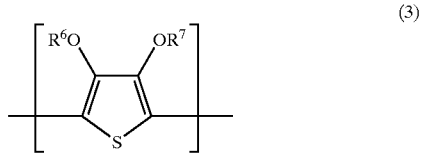

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conductive polymer containing such a chemical structure bears electrical charge and is doped with a dopant. For the dopant, known dopants can be used without limitation. As a specific example of preferable electrically conductive polymer, an electrically conductive polymer obtained by doping poly(3,4-ethylenedioxythiophene) with a dopant can be mentioned.

Specific examples of the inorganic semiconductor include an inorganic semiconductor mainly comprising lead dioxide or manganese dioxide, and an inorganic semiconductor comprising tri-iron tetroxide.

The above-mentioned semiconductors may be used either alone or as a combination of two or more thereof.

When the organic or inorganic semiconductor used has an electrical conductivity of $10^{-2}$ to $10^3$ S/cm, the capacitor produced can have a smaller impedance value and the capacitance thereof at a high frequency can be more increased.

In using the etched metal foil of the present invention for at least one part electrode of a capacitor, the etched metal foil may be cut into a rectangular form and used in this rectangular form or in a coil form.

In the case of using the etched metal foil in a rectangular form, the structure of the final capacitor element may be a rectangular one-capacitor element structure where a dielectric material layer and another part electrode are superposed on the etched metal foil and an electrically conductive layer described later is further formed thereon, or a capacitor element structure where a plurality of such one-capacitor elements are superposed and integrated.

In the case of using the etched metal foil in a coil form, the structure of the final capacitor element may be a capacitor element structure where the rectangular etched metal foil, a substantial outgoing electrode and a separately prepared paper-made or plastic-made separator are wound together into a coil, and then an electrolytic solution or an organic semiconductor is introduced as another part electrode.

Furthermore, in the case where another part electrode is solid, an electrically conductive layer may be provided thereon so as to attain good electrical contact with an exterior outgoing lead (for example, lead frame). The electrically conductive layer can be formed by, for example, solidification of an electrically conductive paste, plating or vapor deposition of metal, or formation of a heat-resistant electrically conductive resin film. Preferred examples of the electrically conductive paste include silver paste, copper paste, aluminum paste, carbon paste and nickel paste. These pastes may be used either alone or as a combination of two or more thereof. In the case of using two or more kinds of pastes, the pastes may be mixed together or may be superposed one on another as separate layers. The electrically conductive paste applied to then solidified by allowing it to stand in the air or under heating. Examples of the plating include nickel plating, copper plating, silver plating and aluminum plating. Examples of the metal vapor-deposition include vapor-deposition of aluminum, nickel, copper and silver.

More specifically, for example, carbon paste and silver paste are superposed in this order on said another part electrode, and these are encapsulated with a material such as epoxy resin, whereby a capacitor is fabricated. In the case where the capacitor element has a coil structure described above, an outgoing lead wire can be previously connected to the etched metal foil of the present invention and the another part electrode by caulking or other means. Examples of the construction material for the outgoing lead wire include tantalum, niobium and aluminum. A part of the lead wire may be plated with solder, tin or other metal so as to attain good connection with an exterior substrate.

The thus-fabricated capacitor element of the present invention is jacketed with, for example, resin molding, resin case, metallic jacket case, dipping of resin or laminate film, and then used as a capacitor product for various uses. When the capacitor element has a coil structure, the capacitor element may be housed in a can to complete a capacitor. In this capacitor, the can is insulated from the outgoing lead wire by an insulating rubber or other insulating material.

EXAMPLES

The present invention will now be described more specifically by referring to the following Examples and Comparative Examples, however, the scope of the present invention is not limited to these Examples.

In the Examples, niobium is described as a representative of the earth-acid metals, which gives a dielectric having a high dielectric constant. However, approximately similar results could be obtained with other earth-acid metals.

The content of nitrogen in an alloy foil and an etched alloy foil was determined using a nitrogen-oxygen analyzer manufactured by LEKO Co. The pore distribution of the etched alloy foil was measured by Autopore 9200 manufactured by Shimadzu Corporation. As for the composition of the alloy foil, Si and P were determined by ICP-AES, C and S were determined by high-frequency combustion/IR, and other elements were determined by ICP-MS. The capacitance of the capacitor manufactured using the etched alloy foil was shown by the capacitance per unit area measured at 120 Hz when the etched alloy foil was chemically formed in an aqueous 0.1 by mass phosphoric acid solution at 80° C. by applying a voltage of 10 V as described hereinbefore.

Manufacture of Alloy Foil

An alloy component(s) shown in Table 1 was added to niobium, and then, a niobium alloy was produced by an arc melting method. A 100 mm-square small piece having a thickness of 5 mm was cut out from the niobium alloy, and an alloy foil was produced therefrom by a hot rolling method and a cold rolling method. The composition and thickness of each alloy foil produced are shown in Table 1. In Table 1, data of alloy foils partially nitrided by allowing alloy foils to stand at 800° C. in a nitrogen atmosphere are also shown.

TABLE 1

| Example | Composition, mass ppm | | | | | Thickness, µm |
|---|---|---|---|---|---|---|
| 1 | Mg | 750 | | | | 300 |
| 2 | Y | 1200 | | | | 360 |
| 4 | Zr | 1800 | | | | 320 |
| 5 | Hf | 6300 | | | | 290 |
| 6 | V | 1500 | | | | 280 |
| 7 | Mo | 1000 | | | | 310 |
| 8 | W | 2600 | | | | 400 |
| 9 | Mn | 580 | | | | 320 |
| 10 | Re | 1400 | | | | 380 |
| 11 | Nd | 550 | | | | 390 |
| 12 | Fe | 600 | | | | 120 |
| 13 | Ru | 750 | | | | 210 |
| 14 | Co | 550 | | | | 130 |
| 15 | Ir | 800 | | | | 180 |
| 16 | Ni | 670 | | | | 110 |
| 17 | Pt | 590 | | | | 360 |
| 18 | Ag | 770 | | | | 160 |
| 19 | Zn | 600 | | | | 90 |
| 20 | B | 1500 | | | | 390 |
| 21 | Al | 800 | | | | 100 |
| 22 | In | 580 | | | | 220 |
| 23 | Si | 650 | | | | 310 |
| 24 | Sn | 870 | | | | 250 |
| 25 | Pb | 690 | | | | 190 |
| 26 | Sb | 880 | | | | 200 |
| 27 | Bi | 1500 | | | | 330 |
| 28 | S | 620 | | | | 190 |
| 29 | Se | 770 | | | | 250 |
| 30 | Ta | 1200 | | | | 100 |
| 31 | Y | 520 | Ti | 510 | | 310 |
| 32 | Zr | 630 | Fe | 440 | | 170 |
| 33 | Hf | 740 | Ni | 480 | | 170 |
| 34 | W | 600 | Zn | 510 | | 200 |
| 35 | Re | 760 | Al | 880 | | 210 |
| 36 | B | 670 | Co | 440 | | 310 |
| 37 | Zr | 600 | B | 400 | | 220 |
| 38 | Ra | 510 | B | 420 Hf | 450 | 250 |
| 39 | Zr | 570 | Mn | 460 Ta | 10000 | 180 |
| 40 | W | 480 | Mo | 440 Ta | 24000 | 210 |
| 41 | B | 530 | N | 2300 | | 230 |
| 42 | Zr | 610 | N | 3800 | | 100 |
| 43 | Zr | 520 | Zn | 460 N | 550 | 160 |

Manufacture of Etched Metal Foil

A small piece of 30×10 mm was cut out from each of the alloy foils of Examples 1 to 40, surface-treated with hydrofluoric acid, and then, subjected to alternating current etching at 80° C. in a separately prepared aqueous 5% by mass tetremethyl ammonium hydroxide solution by using a carbon electrode as a counter electrode at a current density of 5 mA/cm².

The alloy foils of Examples 41 to 43 were subjected to alternating current etching in the same manner as in Examples 1 to 40 except that the surface-treatment was performed using 10% by mass calcium hydroxide in place of hydrofluoria acid.

Each of the etched alloy foils obtained in Examples 40 to 43 was allowed to stand in a nitrogen atmosphere at 350° C. whereby at least a part of the surface of etched alloy including the surface of inside pore was nitrided.

In the thus-produced etched metal foils, the concentration of impurity elements other than niobium, oxygen, nitrogen and an alloy-forming metal element(s) was not larger than 100 ppm by mass various physical properties of each etched metal foil are shown in Table 2.

TABLE 2

| Example | D50 of Pore, µm | Pore Depth, µm | Capacitance, µF/cm² |
|---|---|---|---|
| 1 | 0.5 | 20 | 600 |
| 2 | 0.7 | 25 | 430 |
| 3 | 0.6 | 30 | 840 |
| 4 | 0.7 | 20 | 550 |
| 5 | 0.4 | 30 | 980 |
| 6 | 0.3 | 20 | 880 |
| 7 | 0.8 | 25 | 400 |
| 8 | 0.4 | 20 | 550 |
| 9 | 0.6 | 30 | 450 |
| 10 | 1.0 | 30 | 310 |
| 11 | 0.8 | 25 | 330 |
| 12 | 0.5 | 30 | 450 |
| 13 | 0.6 | 15 | 350 |
| 14 | 0.4 | 20 | 660 |
| 15 | 0.3 | 20 | 720 |
| 16 | 0.8 | 30 | 450 |
| 17 | 2.2 | 35 | 290 |
| 18 | 0.5 | 20 | 510 |
| 19 | 0.4 | 25 | 770 |
| 20 | 0.7 | 20 | 450 |
| 21 | 0.2 | 15 | 1060 |
| 22 | 0.6 | 20 | 480 |
| 23 | 1.0 | 50 | 400 |
| 24 | 0.7 | 20 | 390 |
| 25 | 0.6 | 30 | 570 |
| 26 | 0.7 | 25 | 670 |
| 27 | 0.4 | 30 | 770 |
| 28 | 0.6 | 25 | 550 |
| 29 | 0.6 | 30 | 680 |
| 30 | 0.2 | 30 | 900 |
| 31 | 0.6 | 80 | 470 |
| 32 | 0.8 | 25 | 390 |
| 33 | 0.6 | 25 | 640 |
| 34 | 0.7 | 25 | 570 |
| 35 | 0.8 | 30 | 440 |
| 36 | 0.7 | 40 | 650 |
| 37 | 0.8 | 25 | 550 |
| 38 | 0.7 | 30 | 600 |
| 39 | 0.8 | 25 | 450 |
| 40 | 0.6 | 30 | 670 |
| 41 | 0.3 | 20 | 1000 |
| 42 | 0.2 | 15 | 790 |
| 43 | 0.3 | 15 | 880 |

In Example 10, the current density was adjusted to give pore depths shown in Table 3 and the capacitance with each pore depth is shown in Table 3. As seen in Table 3, when the pore depth is less than 5% by mass, the capacitance tends to decrease to 200 µF/cm² or less.

TABLE 3

| Pore Depth, µm | Pore Depth, % | Capacitance, µF/cm² |
|---|---|---|
| 30 | 8 | 310 |
| 20 | 5 | 210 |
| 15 | 4 | 170 |

Manufacture of Capacitor

A plurality of small rectangular pieces each having a size of 8×3 mm are out out from each of the etched metal foils produced in Examples 30 and 42. A half area (4×3 mm) of each rectangular metal foil piece was chemically formed as follows. A masking comprised of an acrylic resin was applied to a 1×3 mm area adjacent to the half area (4×3 mm) to be chemically formed, so that the masking covers both surfaces and side surfaces of the 1×3 am area like a headband). Using the remaining 3×3 mm area of metal foil piece as the anode terminal and a Ta plate for the cathode, the half area (4×3 mm) adjacent to the masking was dipped in a separately prepared aqueous 0.1% by mass phosphoric acid solution, and chemically formed at 80° C. for 1,000 minutes in the aqueous phosphoric acid solution. The oxide dielectric film thus-formed on the surface of the half area (4×3 mm) was confirmed to comprise, as a main component, niobium oxide comprised of diniobium pentoxide. On the oxide dielectric film, a semiconductor layer shown as another part electrode in Table 4 was superposed and then, a carbon paste and a silver paste were superposed in this order to produce a capacitor element. A 2×3 mm portion of the anode terminal part of the produced capacitor element was cut and removed, while the remaining 1×3 mm portion of the anode part adjacent to the masking was used as an anode of the resulting capacitor. Four sheets of the thus-fabricated capacitor elements were superposed so that the sheets were aligned in the same direction (silver paste parts of capacitor elements were connected using a silver paste; the anode parts were superposed but not electrically connected). To two protruded parts of a separately prepared lead frame, the anode part and the silver paste part were electrically and mechanically connected using welding and silver paste, respectively. The resulting assembly of capacitor elements excluding a part of the lead frame was encapsulated with an epoxy resin to fabricate a capacitor having an outside dimension of 7.3×4.3×2.8 mm. The performances of the thus-obtained capacitors are shown in Table 5.

The performance of a capacitor manufactured in the same manner as in Example 44 except that a conventional etched aluminum foil (thickness: 100 $\mu$m, capacitance: 100 $\mu$F/cm$^2$) was used is shown as Comparative Example 1 in Table 5.

TABLE 4

| Example | Etched Metal Foil | Another Part Electrode | Method of Forming Another Pat Electrode |
|---|---|---|---|
| Example 44 | Etched foil produced in Example 30 | Dope of polypyrrole in aromatic sulfonic acid | Repetition of oxidation reaction in pyrrole gas |
| Example 45 | Etched foil produced in Example 30 | Manganese dioxide | Repetition of thermal decomposition of manganese nitrate |
| Example 46 | Etched foil produced in Example 42 | Dope of polythiophene derivative in aromatic sulfonic acid | Repetition of oxidation reaction in thiophene derivative solution |
| Example 47 | Etched foil produced in Example 42 | Mixture of lead dioxide and lead sulfate (lead dioxide: 98% by mass) | Repetition of oxidation reaction in aqueous lead acetate solution |

TABLE 5

| Example, Comparative Example | Capacitance 120 Hz ($\mu$F) | average of n = 10 ESR 100 KHz ($\Omega$) | LC 4 V ($\mu$A) |
|---|---|---|---|
| Example 44 | 180 | 0.03 | 3.3 |
| Example 45 | 185 | 0.1 | 2.4 |
| Example 46 | 162 | 0.03 | 3.5 |
| Example 47 | 160 | 0.03 | 2.0 |
| Comparative Example 1 | 24 | 0.08 | 0.4 |

On comparison of Examples 44 to 47 with Comparative Example 1 in Table 5, it is seen that the LC value per capacitance is from 0.01 to 0.02 $\mu$A/F (around 0.005 CV as the CV value) and there is not so large difference, nevertheless, the capacitance of Examples is about 7 times larger than that of Comparative Example 1. On comparison between Example 44 and Comparative Example 1, it is seen that Example 44 has a smaller ESR and higher high-frequency performance.

Industrial Applicability

The metal foil of the present invention having a surface roughened by etching, which is made of an alloy compressing an earth-acid metal as a main component, is useful for an electrode of a capacitor. The capacitor provided with this electrode exhibits good high-frequency characteristics, and can be a small-size capacitor having a large capacitance.

What is claimed is:

1. A metal foil having a surface roughened by etching, characterized in that the metal foil is made of an alloy comprising an earth-acid metal as a main component, and has a surface area at least 50 times the surface area before etching.

2. The metal foil according to claim 1, wherein the earth-acid metal is niobium.

3. The metal foil according to claim 1, wherein said alloy comprising an earth-acid metal as a main component is an alloy of an earth-acid metal with at least one element selected from the group consisting of Groups 3 to 16 as expressed by the group number of the periodic table.

4. The metal foil according to claim 1, wherein the metal foil has been partially nitrided.

5. The metal foil according to claim 4, wherein at least a part of the surface of the metal foil including the surface of inside pores has been partially nitrided.

6. The metal foil according to claim 1, wherein the metal foil has pores at least in a region spanning from the surface to a depth of 5% or more of the foil thickness in the foil thickness direction.

7. The metal foil according to claim 6, wherein the pores have an average pore diameter not larger than 10 $\mu$m.

8. The metal foil according to claim 1, wherein the concentration of impurity elements other than tantalum, niobium, oxygen, nitrogen and an alloy-forming metal element in the alloy is not larger than 300 ppm by mass.

9. The metal foil according to claim 1, which gives an electrostatic capacitance of at least 200 $\mu$F/cm$^2$ per area (projected area) not including pore areas of the metal foil, to a capacitor comprised of one part electrode made of the metal foil, a dielectric material foxed on the surface of said metal foil by electrolytic oxidation at an imposed voltage of 10 V, and another part 1 electrode provided on said dielectric material.

10. A metal foil having a surface roughened by etching, characterized in that the metal foil is made of an alloy comprising an earth-acid metal as a main component, and has pores at least in a region spanning from the surface to a depth of 5% or more of the foil thickness in the foil thickness direction, wherein the pores have an average pore diameter not larger than 10 $\mu$m.

11. The metal foil according to claim 10, wherein the earth-acid metal is niobium.

12. The metal foil according to claim 10, wherein said alloy comprising an earth-acid metal as a main component is an alloy of an earth-acid metal with at least one element selected from the group consisting of Groups 3 to 16 as expressed by the group number of the periodic table.

13. The metal foil according to claim 10, wherein the metal foil has been partially nitrided.

14. The metal foil according to claim 13, wherein at least a part of the surface of the metal foil including the surface of inside pores has been partially nitrided.

15. The metal foil according to claim 10, wherein the concentration of impurity elements other than tantalum, niobium, oxygen, nitrogen and an alloy-forming metal element in the alloy is not larger than 300 ppm by mass.

16. The metal foil according to claim 10, which gives an electrostatic capacitance of at least 200 $\mu F/cm^2$ per area (projected area) not including pore areas of the metal foil, to a capacitor comprised of one part electrode made of the metal foil, a dielectric material formed on the surface of said metal foil by electrolytic oxidation at an imposed voltage of 10 V, and another part electrode provided on said dielectric material.

17. A metal foil having a surface roughened by etching, which is made of an alloy comprising an earth-acid metal as a main component, and which gives an electrostatic capacitance of at least 200 $\mu F/cm^2$ per area (projected area) not including pore areas of the metal foil, to a capacitor comprised of one part electrode made of the metal foil, a dielectric material formed on the surface of said metal foil by electrolytic oxidation at an imposed voltage of 10 V, and another part electrode provided on said dielectric material.

18. The metal foil according to claim 17, wherein the earth-acid metal is niobium.

19. The metal foil according to claim 17, wherein said alloy comprising an earth-acid metal as a main component is an alloy of an earth-acid metal with at least one element selected from the group consisting of Groups 3 to 16 as expressed by the group number of the periodic table.

20. The metal foil according to claim 17, wherein the metal foil has been partially nitrided.

21. The metal foil according to claim 20, wherein at least a part of the surface of the metal foil including the surface of inside pores has been partially nitrided.

22. The metal foil according to claim 17, which has pores at least in a region spanning from the surface to a depth of 5% or more of the foil thickness in the foil thickness direction.

23. The metal foil according to claim 17, wherein the concentration of impurity elements other than tantalum, niobium, oxygen, nitrogen and an alloy-forming metal element in the alloy is not larger than 300 ppm by mass.

24. A capacitor comprising a pair of electrodes and a dielectric material interposed between said pair of electrodes, wherein at least one of the electrodes is made of the metal foil as claimed in claim 1.

25. The capacitor according to claim 24, wherein the dielectric material comprises tantalum oxide or niobium oxide as a main component.

26. The capacitor according to claim 24, wherein the dielectric material comprises ditantalum pentoxide or diniobium pentoxide as a main component.

27. The capacitor according to claim 25, wherein the dielectric material has been formed by electrolytic oxidation.

28. The capacitor according to claim 24, wherein another part electrode is comprised of at least one material selected from electrolytic solutions, organic semiconductors and inorganic semiconductors.

29. The capacitor according to claim 24, wherein another part electrode is comprised of an organic semiconductor which is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conductive polymer obtained by doping with a dopant a polymer having repeating units represented by the following formula (1) or (2):

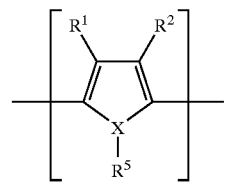

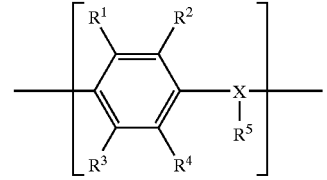

wherein $R^1$ to $R^4$ each independently represents a monovalent group selected from the group consisting of a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a trifluoromethyl group, a phenyl group and a substituted phenyl group; the hydrocarbon chains of $R^1$ and $R^2$, or the hydrocarbon chains of $R^3$ and $R^4$ may combine together with each other at an arbitrary position to form a divalent chain for forming at least one 3-, 4-, 5-, 6- or 7-membered cyclic saturated or unsaturated hydrocarbon structure together with the carbon atoms having bonded thereto $R^1$ and $R^2$ or $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; and $R^5$ is present only when X is a nitrogen atom, and independently represents a hydrogen atom or a linear or branched, saturated or unsaturated alkyl group having from 1 to 10 carbon atoms.

30. The capacitor according to claim 29, wherein the organic semiconductor is at least one member selected from the group consisting of polypyrrole, polythiophene, polyaniline and substitution derivatives thereof.

31. The capacitor according to claim 29, wherein the electrically conductive polymer represented by the formula (1) is an electrically conductive polymer having repeating units represented by the following formula (3):

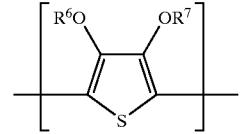

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

32. The capacitor according to claim 31, wherein the electrically conductive polymer is an electrically conductive polymer obtained by doping poly(3,4-ethylenedioxythiophene) with a dopant.

* * * * *